United States Patent [19]

Marshall

[11] Patent Number: 5,511,085
[45] Date of Patent: Apr. 23, 1996

[54] PASSIVELY STABILIZED INTRACAVITY DOUBLING LASER

[75] Inventor: Larry R. Marshall, Reston, Va.

[73] Assignee: Light Solutions Corporation, Mountain View, Calif.

[21] Appl. No.: 300,137

[22] Filed: Sep. 2, 1994

[51] Int. Cl.$^6$ ....................................................... H01S 3/10
[52] U.S. Cl. .............................................. 372/22; 359/326
[58] Field of Search ............................. 372/22; 359/326, 359/328

[56] References Cited

U.S. PATENT DOCUMENTS

| | | | |
|---|---|---|---|
| 3,982,201 | 9/1976 | Rosenkrantz | 372/75 |
| 4,035,742 | 7/1977 | Schiffer | 372/6 |
| 4,272,733 | 6/1981 | Walling et al. | 372/41 |
| 4,383,318 | 5/1983 | Barry et al. | 372/6 |
| 4,553,238 | 11/1985 | Shaw et al. | 372/66 |
| 4,567,598 | 1/1986 | Noguchi et al. | 372/36 |
| 4,653,056 | 3/1987 | Baer et al. | 372/27 |
| 4,656,635 | 4/1987 | Baer et al. | 372/27 |
| 4,710,940 | 12/1987 | Sipes | 372/27 |
| 4,739,507 | 4/1988 | Byer et al. | 372/22 |
| 4,805,177 | 2/1989 | Martin et al. | 372/75 |
| 4,884,277 | 11/1989 | Anthon et al. | 372/22 |
| 4,884,281 | 11/1989 | Hawthorn et al. | 372/75 |
| 4,887,270 | 12/1989 | Austin | 372/22 |
| 4,908,832 | 3/1990 | Baer | 372/75 |
| 5,249,190 | 9/1993 | Kortz et al. | 372/22 |

OTHER PUBLICATIONS

Liu, L. Y., et al., "Longitudinally diode–pumped continous-wave 3.5 W green laser", Opt. Lett., Feb. 1994, vol. 19, No. 3, pp. 189–191.

Nightingale, J. L., and Johnson, J. K., "0.6W, stable, single-frequency, green laser", Proceedings of Topical Meeting on Compact Blue-green Lasers, Feb. 10–11, 1994, Salt Lake City, UT, post-deadline paper PD6–1.

Cunningham, R., "Adventures in the blue-green", Lasers & Optronics, Apr. 1994, p. 31.

MacKinnon et al., "Ultracompact, LD–array–pumped Nd:YVO$_4$/KTP frequency–doubled composite material microchip laser", Proceedings of Conference on Laser and Electroptics CLEO '94, May 8–13, 1994 Anaheim, CA., paper CTUP2, p. 156.

Marshall, L. R., et al., "Intracavity Doubled Mode–Locked and CW Diode–Pumped Lasers", IEEE Journal of Quantum Electronics, Apr. 1992, vol. 28, No. 4, pp. 1158–1163.

Taira, et al., "Single–mode oscillation of laser–diode–pumped Nd: YVO$_4$ microchip lasers", Opt. Lett., Dec. 1991, vol. 16, pp. 1955–1957.

James, G. E., et al., "Elimination of chaos in an intracavity–doubled Nd: YAG laser", Opt. Lett., Oct. 1990, vol. 15, No. 20 p. 1141.

Anthon, D. W., et al., "Stable multilongitudinal–mode operation of a diode–pumped twisted–mode intractivity doubled Nd: YAG laser", CLEO '90, May 23, 1990, paper CWC4, p. 232.

Dixon, G. J., "Frequency–doubling schemes turn CW DPLs into visible sources", Laser Focus World, Sep. 1990, p. 99.

Kintz, G. and Baer, T., "Single frequency operation in solid–state laser materials with short absorption depths", IEEE J. Quantum. Electron., Sep. 1990, vol. 26, No. 9, pp. 1457–1459.

(List continued on next page.)

Primary Examiner—Rodney B. Bovernick
Assistant Examiner—Robert E. Wise
Attorney, Agent, or Firm—Lahive & Cockfield

[57] ABSTRACT

A diode pumped laser is wavelength converted using an intracavity non-linear optical crystal, and the wavelength converted output is passively stabilized by a short cavity using unpolarized laser output. End pumping limits the number of transverse cavity modes, and intracavity etalon effects may be achieved by additional coatings deposited upon the laser or non-linear crystals themselves, further reducing the longitudinal mode spectrum. Wavelength converted output is enhanced by minimizing backward conversion in a linear cavity, or by folding the cavity via an angled face of the non-linear or the laser crystal.

24 Claims, 5 Drawing Sheets

OTHER PUBLICATIONS

Burnham, R. and Hays, A. D., "High-power diode-array-pumped frequency-doubled Nd: YAG laser", *Opt. Lett.*, Jan. 1989, vol. 14, No. 1, pp. 27–29.

Oka, M. and Kubota, S., "Stable intracavity doubling of orthgonally linearly polarized modes in diode-pumped Nd: YAG lasers", *Opt. Lett.*, Oct. 1988, vol. 13, pp. 805–807.

Baer, T., "Large-amplitude fluctuations due to longitudinal mode coupling in diode-pumped intracavity-doubled Nd: YAG lasers", *J. Opt. Soc. Am.*, Sep. 1986, vol. B3, pp. 1175–1180.

Zhou, B. et al., "Efficient, frequency-stable laser-diode-pumped Nd: YAG laser", *Optics Letters*, Feb. 1985, vol. 10, No. 2, pp. 62–64.

Kubodera, K. and Noda, J., "Pure single-mode $LiNdP_4O_{12}$ solid-state laser transmitter for 1.3-µm fiber-optic communications", *Appl. Opt.*, Oct. 1982, vol. 21, No. 19, pp. 3466–3469.

Chinn et al., "Intracavity second-harmonic generation in Nd: Pentaphosphate laser", *Appl. Phys. Lett.*, Aug. 1966, vol. 29, pp. 176–179.

Keyes, R. J. and Quist, T. M., "Injection luminescent pumping of $CaF_2:U^{3+}$ with GaAs diode lasers", *Appl. Phys. Lett.*, Feb. 1964, vol. 4, No. 3, pp. 50–52.

Culshaw et al., "Efficient frequency doubled single frequency Nd: YAG laser", *J. Quant. Electron.*, vol. 10, No. 2 (Jan. 1974) p. 253.

Rosenkrantz, L. J., "GaAs diode-pumped Nd: YAG laser", *J. Appl. Phys.*, Nov. 1972 vol. 43, No. 11, pp. 4603–4605.

PASSIVELY STABILIZED INTRACAVITY DOUBLING LASER

BACKGROUND AND TECHNICAL FIELD

The invention relates generally to lasers and particularly to diode-pumped intracavity doubled lasers.

Intracavity frequency doubling of solid-state lasers has been plagued by the so-called "green problem" as described in T. Baer J. Opt. Soc. Am. 3 (1175) 1986, which causes the doubled output to exhibit chaotic fluctuations in power.

Stable intracavity frequency doubling has generally been achieved by some researchers only by forcing the laser to operate in a single longitudinal and single polarization mode. However, others have recently reported stable operation in two longitudinal modes of orthogonal polarizations, when a doubling crystal, which is birefringent, is made to act as a waveplate and a second waveplate is used to decouple the two orthogonally polarized longitudinal modes. An intracavity "noise suppression" etalon is used in these latter laser constructions to narrow the longitudinal mode spectrum as is known, for example, from L. Y. Liu, et al., Opt. Lett., Vol. 19 (1994) pp. 189; and shown in U.S. Pat. No. 4,656,635 of Baer & Kierstead.

There is an optimum polarization for frequency doubling, defined by the orientation of the doubling crystal's axes, such that in this optimum orientation, the doubling efficiency is maximized. Constructions seeking to optimize doubling in this manner (as in Baer, et al., U.S. Pat. Nos.: 4,653,056; 4,723,257; 4,756,003; 4,701,929; 4,872,177), require the intracavity fundamental light to be polarized, so as to match the optimum polarization for the doubling crystal.

When the doubling crystal is a birefringent one, such as KTP, there are additional problems caused by depolarization of the fundamental laser radiation, as noted in papers of Liu, et al., Nightingale & Johnson, and James, et al. These problems may be avoided by cutting the length of the doubling crystal to act as a waveplate with an integral number of waves retardation, i.e., to act as a full-wave plate; see for example, J. L. Nightingale & J. K. Johnson. 0.6 W Stable, Single-Frequency Green Laser, Proceedings of Topical Meeting on Compact Blue-Green Lasers, Feb. 10–11, Salt Lake City, Utah (1994), paper PD6-1. In addition, the frequency doubler must be actively temperature stabilized, otherwise the birefringence will vary with temperature shifts (Nightingale & Johnson, Liu, et al.). Nightingale & Johnson use a ring cavity to achieve single-frequency operation and this requires tight temperature control of the laser crystal and of the doubler. Liu, et al., use a folded cavity with an intracavity etalon to achieve single-frequency operation and this also requires tight temperature control. Oka & Kubota have shown that an intracavity waveplate can be used to obtain stable frequency doubling of unpolarized light, provided the doubler and the waveplate are actively temperature stabilized to within a fraction of a degree. Thus, all of these constructions require additional control or light conditioning elements, and in general result in relatively low overall electrical-to-light output efficiency.

To increase output power of the second harmonic, one prior art construction has the cavity folded to achieve two-pass doubling, as in U.S. Pat. No. 4,887,270 of Austin. One cannot, in general, simply extract the backward pass through the back mirror, after it has passed through the laser rod, because the majority of solid-state media are strongly absorbing at their second harmonic wavelength.

If the laser crystal is an anisotropic medium such as Nd:YAG, then the folding mirror will cause a slight discrimination between the gains of s- and p-polarizations of laser emission. The s-polarization experiences the highest mirror reflectivity, and, therefore, the lowest loss in the laser cavity. Lasers tend to lase in their lowest loss state, so the polarization of the fundamental orients itself to minimize the loss; i.e., the laser lases in s-polarization.

When the axes of the doublers are aligned with the laser polarization, the frequency doubling and the subsequent output coupling from the cavity of the fundamental light, is yet another loss mechanism for the laser. When the laser experiences this loss, it tends to lase in a different polarization to minimize loss. Thus, an inherently unstable situation occurs. As a result, folding the laser cavity without employing strong polarizing techniques, such as an intracavity Brewster plate to inhibit lasing in other polarizations, results in lower output power.

In most materials, especially Nd:YAG, there is strong thermal birefringence which rotates the fundamental polarization. When a birefringent doubling crystal is placed within the cavity, it too rotates the polarization of the intracavity light. Such rotation causes loss by output coupling through the strong polarizing element; e.g., reflection off the Brewster plate and out of the laser cavity.

Nevertheless, folded intracavity doubled lasers have been made by controlling the birefringence of the frequency doubling crystal with precise temperature control, and compensating for the thermally induced depolarization introduced by the laser crystal, as reported in a 1988 paper of Oka and Kubota; in Liu, et al., supra.; in Anthon & Sipes, Proceedings of Conference on Lasers and Electrooptics, Anaheim, Calif., paper CWC3 (1990); and in U.S. Pat. Nos. 4,887,270 and 4,884,277. These techniques complicate the construction of the laser and require a high degree of thermal control.

Microchip lasers have been made to achieve single-frequency operation by making the laser cavity so short that only one longitudinal mode can lase. Effectively, this requires cavity lengths less than one millimeter, as reported by Taira, et al. in Opt. Lett. Vol. 16 (1991) pp. 1955. To lase effectively with such short cavity lengths, the laser crystals, which are pumped longitudinally, are to exhibit extremely high absorption of the diode pump light. MacKinnon, et al. in Proceedings of Conference on Lasers and Electrooptics CLEO '94, May 8–13, Anaheim, Calif. (1994) have recently reported using these lasers in frequency doubling constructions with low amplitude noise by bonding a doubling crystal directly onto the laser chip, thus retaining a short cavity length.

Another construction for a high absorption laser uses an ultra-short length of gain medium placed adjacent to one cavity mirror. This latter construction was developed to prevent spatial hole burning. Since all longitudinal modes have a node at the end mirrors, no hole burning can occur in a gain medium at an end mirror if the gain medium is sufficiently short. Reportedly, the gain length should be shorter than 250 µm. G. Kintz & T. Baer IEEE J. Quantum Electron, Vol. 26 (1990) pp. 1457.

In summary, prior constructions employ active temperature stabilization of the frequency doubling crystal, of intracavity waveplates or etalons and, generally, of the laser crystal itself. Slight changes in birefringence, due for example to misalignment of the doubling crystal, cause output instabilities. The lasers are forced to operate in a single longitudinal mode in one or both of two orthogonally polarized directions.

A passively stabilized laser that does not require tight temperature control or many intracavity elements is desirable. Preferably, a construction for such a laser is to be robust and insensitive to vibration.

A linear cavity is deemed simpler and cheaper to construct because it requires fewer optical elements, and potentially results in fewer losses than a folded cavity. A further objective is a stable operating construction that recovers the doubled-frequency light generated on the return pass back through the doubling crystal, and directs it into a usable output beam.

SUMMARY OF THE INVENTION

A laser apparatus, according to the present invention, provides stable continuous wave (CW) frequency-doubled laser output at relatively high power using intracavity frequency doubling with a novel passive stabilization technique that does not require polarizing the fundamental laser radiation. It employs a short cavity length to stabilize lasing conditions.

The invention attains these and other results without requiring temperature stabilization of the Nightingale & Johnson, or Liu, et al. constructions, without requiring intracavity etalons or polarizers or polarization rotators, and without requiring precise alignment of the doubler axes with respect to polarization of the fundamental light. Simple embodiments of the invention employ laser crystals of nominal doping, rather than the unusually high doping level commonly used in microchip lasers or in the single-frequency laser of Kintz & Baer, supra. Furthermore, the intracavity fundamental light is unpolarized, thus allowing simple construction and relatively high efficiency.

Preferably, cavity optics minimize the amount of doubled light generated in the backward pass, i.e., in light propagating toward the laser crystal. This reduces loss due to absorption of such doubled light in the laser crystal and increases the fundamental radiation available to be doubled when it returns on the second or later forward pass. By allowing the frequency doubler to act in only one direction, the invention achieves a frequency doubled output having a higher energy level than comparable prior structures.

In a basic embodiment of the invention, the laser and the frequency doubler form a single linear cavity. Preferably, a fiber-coupled diode array drives the laser crystal and tightly controls the transverse dimension of pump volume while allowing tight focusing in a short longitudinal extent of a laser crystal, which may be, for example, a Nd:YAG rod. The back mirror can be coated directly on the rod. An overall cavity length between about 10–30 mm lowers constraints on alignment, and causes the longitudinal modes to be sufficiently isolated to inhibit mode hopping; it thereby produces stable operation over a wide temperature range. A curved output mirror, selected to reflect light at the frequency of the optical pump and to transmit the frequency doubled light, decreases frequency doubling efficiency in backward traverses of the cavity to produce a multi-pass beam that is doubled primarily in the forward passes. As discussed further below, the presence of the doubler within the cavity prevents spiking of the fundamental frequency of the laser output. The short cavity length assures that mode beating of the doubled light falls in the gigahertz range, and that the doubled light may be considered continuous wave for all practical applications.

BRIEF DESCRIPTION OF THE DRAWINGS

These and other characteristics of the invention will be understood from the description that follows, taken together with the drawings, wherein:

FIGS. 6(a) and 6(b) show a folded resonator for two pass doubling with extraction in a single, unidirectional output beam.

FIGS. 7(a) and 7(b) show an alternative folded cavity where the fold is made by an angled face on the laser crystal.

DETAILED DESCRIPTION

Figure 1:
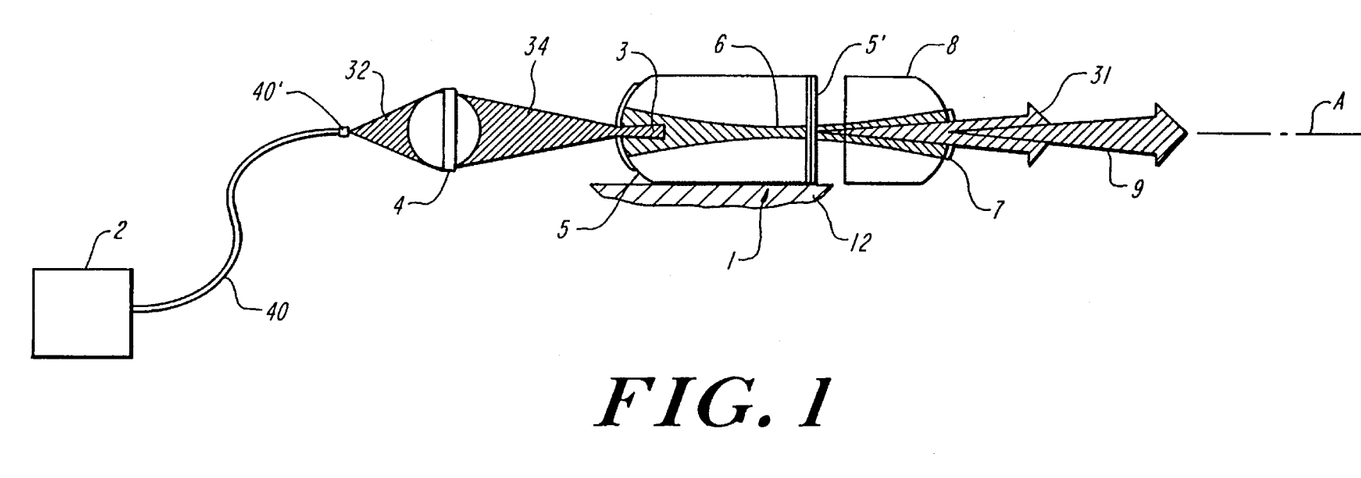
FIG. 1 shows a preferred embodiment of an intracavity doubled laser, which is end-pumped with a fiber-coupled diode array, wherein the cavity length and the transverse mode stabilize the frequency-doubled output.

FIG. 1 shows a preferred embodiment of the system of the present invention, in which a laser rod or crystal 1 is pumped by a laser diode array. The diode array 2 is coupled via an optical fiber or fiber bundle 40 to an output coupler 40' which provides a defined pump light beam 3a. Optical elements 4, e.g., one or more lenses, focus and direct the incident pump beam 3a into a shaped pumping beam 3b onto an entry and face 5 of the crystal 1. In the illustrated embodiment, the laser crystal 1 is end-pumped by the fiber-coupled diode array; that is, the pump radiation is directed along the same axis along which the laser crystal 1 emits fundamental radiation. The fiber coupling allows the pump laser array 2 to have a high degree of flexibility in package design, yet achieves precise alignment with respect to the input optics 4. The illustrated diode pump construction is similar to that reported, for example, by K. Kubodera and J. Noda, in Appl. Opt. vol. 21 (1982) pp. 3466.

With further reference to FIG. 1, the pumping beam 3b is directed into a small gain region 3 in the crystal 1 and excites the emission of a fundamental laser beam 6. The beam 6 passes along axis A and through the front face 5' of the crystal 1 into a second crystal or medium which is a non-linear optical element 8. This element 8 converts the fundamental beam into a frequency-doubled beam, that exits on the illustrated beam 9. The doubled frequency is also termed a second harmonic. At the far, i.e., rightmost, end of the non-linear element 8, a mirror 7 reflects energy at the fundamental frequency of beam 6, i.e., reflects beam 6 energy not converted to the doubled frequency, to re-traverse the element 8 and crystal 1, first in a right to left direction and thence back, from the face 5, toward the right. This re-traversed energy that is converted in the non-linear element 8 to the second harmonic exits as the illustrated beam 31, and hence augments the beam 9.

The back face 5 of the laser crystal 1 is coated to transmit the incident diode radiation of beam 3b and to reflect totally the beam of fundamental laser radiation 6 which is generated by the laser crystal in response to the diode pumping. The front face 5' of the laser rod, or crystal 1 is anti-reflection coated at the fundamental laser wavelength. The laser crystal 1 preferably is mounted on a conductive heat sink 12 (shown schematically) which removes heat generated by residual diode light. A laser cavity is formed by the back face 5 of the laser crystal 1 and a separate mirror 7 and the optical elements—e.g., crystal 1 and element 8—therebetween. The mirror 7 is highly reflecting at the fundamental wavelength, and is highly transmitting at the second harmonic wavelength, i.e., one-half the fundamental wavelength.

Several other features of the preferred embodiment are shown in FIG. 1, and are discussed further below in connection with FIGS. 9 and 10, and are thus only briefly mentioned here. Among these features, front face 5; is preferably coated to be highly reflecting at the doubled wavelength, like mirror 30 of the aforesaid FIG. 9, so that the backward pass, i.e., directed right to left in FIG. 1, of doubled light (i.e., frequently-doubled light emitted in the non-linear element 8 and propagating toward the laser crystal 1) is reflected 180° to form a doubled beam 31 traveling in the output direction, i.e., left to right, to augment the doubled beam 9. This construction and operation reduces absorption of doubled light by the laser crystal 1, which might otherwise generate significant heat. Another such feature, indicated by the multi-layer depiction of front face 5' in FIG. 1, is a construction whereby the reflective surface at this position—either coated on face 5' or separately positioned and rigidly aligned therewith—is aligned to constitute, together with the back mirror 5, an intracavity etalon which limits the number of longitudinal cavity modes. If coated directly on the crystal face 5', like the element 35 of FIG. 10, below, the coating makes crystal 1 into a monolithic etalon, and produces high stability of the etalon mirror alignment.

According to one aspect of the invention, the diode-pumped laser is passively stabilized, i.e., is stabilized other than by special environmental control feedback; signal or light conditioning; and other than by additional optical elements beyond the cavity and the coupler-defining elements. The invention achieves such stabilization in this embodiment of FIG. 1 with an intracavity doubler.

It is contemplated that the solid-state laser system of FIG. 1 may be pumped with other sources of pump light, and may also be used with other types of intracavity non-linear crystal, in addition to frequency doubling crystals. For example, an intracavity optical parametric oscillator, as disclosed in U.S. Pat. No. 5,181,255, can be stabilized in accordance with constructions of the present invention. However, for clarity of exposition, the discussion below focuses on basic embodiments of a laser diode-pumped laser system with an intracavity frequency doubler, rather than on the generally more complex systems that have other non-linear crystal components, or other pump sources.

Figure 2:
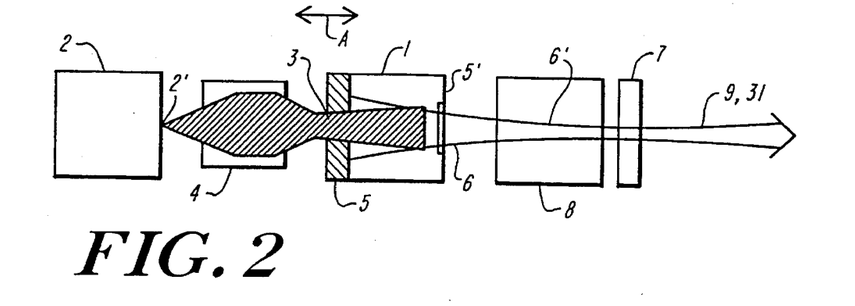
FIG. 2 shows a detailed view of the laser portion of FIG. 1, with cavity mirrors illustrated as separate elements.

FIG. 2 shows another representation of the preferred embodiment of FIG. 1, in which mirrors are illustrated as separate optical elements rather than coated directly onto the crystals that provide the lasing action or frequency doubling. The diode pumping radiation is emitted from the output coupler 40' at a small aperture that is preferably circular and with a diameter typically less than 1 mm. The pumping radiation is focused onto the end of the laser crystal 1 using an optical imaging element 4, such as a rod lens, i.e., a segment of a rod with a radially graded index of refraction. The back face 5 of the laser crystal 1 is coated to transmit the diode radiation and to reflect totally the beam of fundamental laser radiation 6 which is generated by the laser crystal in response to the diode pumping. The front face 5' of the laser crystal or rod 1 is anti-reflection coated at the fundamental laser wavelength. The laser crystal 1 preferably is mounted on a conductive heat sink (not shown) which removes heat generated by residual diode light. A laser cavity is formed by the back face 5 of the laser crystal 1 and a separate mirror 7 and includes the optical elements therebetween. The mirror 7 is highly reflecting at the fundamental wavelength, and is highly transmitting at the second harmonic wavelength, i.e., one-half the fundamental wavelength.

Within the laser cavity formed by the reflectors 5 and 7 is a frequency doubling crystal 8 which doubles the frequency (halves the wavelength) of the fundamental laser light emitted from the laser crystal. The overall distance, along the optical axis A of the system, between the back 5 of the laser crystal 1 and the front mirror 7 is below about 100 mm, and preferably is around ten to twenty mm. For a given pair of elements 1 and 8, the ideal cavity length is determined by varying the position of the front mirror 7 while monitoring the second harmonic output of the laser system with a fast detector to detect fluctuations in beam energy at the frequency of the second harmonic. When the output is stable, the optimum length has been achieved. At this point, the mirror 7 is locked in position along the optical axis A and relative to the elements 1 and 8.

A brief discussion of the theory of the invention will clarify the foregoing construction. When a laser cavity is too long, many longitudinal modes can lase under the gain bandwidth of the laser. The modes beat together and they can destabilize the laser output. For a ten millimeter spacing about twenty modes can lase. Typically, only a few modes near the peak of the gain profile of the laser material will actually lase. If the cavity is shortened, the spacing of these longitudinal modes, which is equal to $c/2nL$ (where c is the speed of light, L is the cavity length and n the index of refraction), is increased. Further reduction of cavity length to around one millimeter precludes all other modes, and the laser necessarily lases "single-frequency". Such operation has been achieved in a "microchip" laser.

Mode beating, as well as mechanical vibrations, or sudden changes in pumping power, can trigger so-called "relaxation oscillations" which cause "spiking" of the laser output. Spiking causes large pulses of laser output, generally less than a microsecond in duration to occur at a high rate. The spiking frequency varies with cavity length; a one centimeter cavity has a 250 kHz spiking frequency, while a twenty-five centimeter cavity spikes at only 50 kHz. As the cavity length is decreased, the spiking frequency increases. The pulse width of individual spikes also becomes shorter.

For short cavities and high pumping intensity (with correspondingly high gain), the spiking frequency will exceed 200 kHz and the spike width will be less than one hundred nanoseconds. With this pulse length, frequency doubling efficiency is enhanced due to the higher peak power. Furthermore, at this high pulse repetition frequency, more second harmonic power is extracted from the laser than for CW lasing. If spiking were to occur, the laser output would exhibit large peaks of intensity which would double more efficiently and, thus, result in greater loss of fundamental power. Since a laser tends to lase in the lowest loss state, it follows that such spiking does not occur and the laser does not exhibit these loss increasing fluctuations. That is, the laser is self stabilizing.

This is the theoretical reason for use of the short cavity construction of the present invention.

In laser apparatus according to the present invention with a non-linear intracavity element, the frequency converted output is not necessarily single frequency, and it may therefore exhibit mode beating. However, because the cavity is so short, the modes are spaced far apart in frequency, and the mode beating frequency is very high (typically several GHz) such that it can not be observed without extremely sophisticated oscilloscopes and detectors. The fastest commercially-available oscilloscope has a real-time band width of about 1 GHz, so that fluctuations at several GHz are difficult to see. For typical laser applications, sources with fluctuations faster than 500 MHz can be considered as continuous wave. Mode beating of the doubled light may therefore be ignored.

Figure 14:
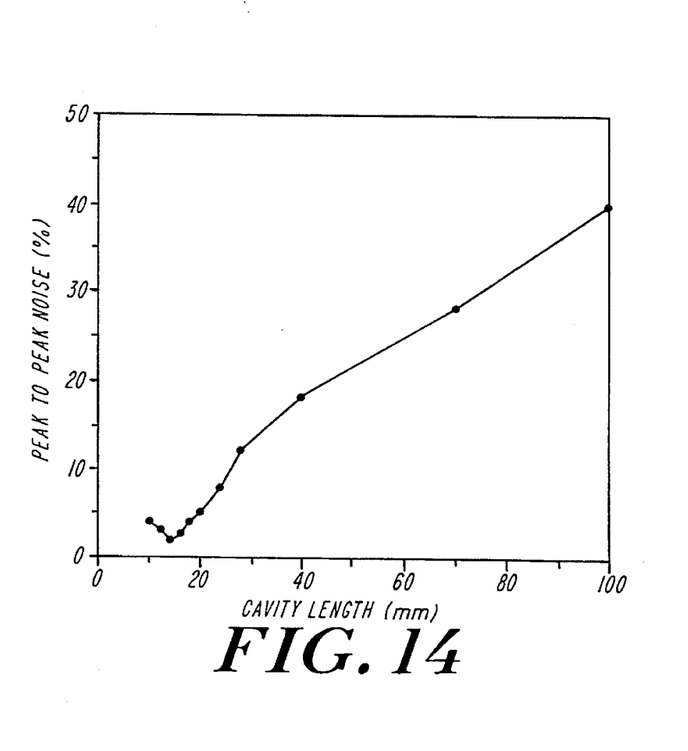
FIG. 14 shows peak-to-peak amplitude fluctuations (noise) in doubled output as a function of optical cavity length in a prototype embodiment.

FIG. 14 presents demonstrated experimental results obtained from an intracavity frequency-doubled laser in accord with FIGS. 1 and 2. With reference to this figure, the optimum range of cavity lengths over which stability is achieved is approximately ten to thirty millimeters. These results were obtained using the layout depicted schematically in FIG. 1, and in which a nominally doped (1% Nd) Nd:YAG laser rod was end-pumped by a fiber-coupled diode array with about 10 W of 808 nm diode output. The rod was 6 mm long. The optical cavity was linear, and the back mirror was coated directly onto the end of the laser rod. The doubling crystal was KTP cut for Type-11 doubling.

An illustrative embodiment of laser apparatus according to the invention is implemented in a linear cavity. Mirrors which are preferably flat are employed to retroreflect the fundamental and second harmonic-generated radiation back through the doubling crystal, reflection canceling the walkoff caused by the first pass and so improving conversion efficiency of the second pass. Note that if the walkoff is not canceled, the fundamental and second harmonic beams can not interact and efficiency of the second pass would be lower. For linear cavity embodiments described below in which only the forward pass is extracted, higher efficiency is achieved if the reverse pass does not double efficiently, as this increases the pump radiation available for the next forward pass through the laser crystal. Several constructions for achieving this are described below.

Preferred embodiments of the short cavity and passively stabilized laser according to the invention employ a fiber-coupled diode array, achieving power scaling by coupling the outputs of several diodes together while retaining the tight focusing properties of the fiber-coupled output. An advantage of this approach is to simultaneously minimize the transverse and longitudinal extent of the pump volume; the former, to limit noise due to transverse mode beating; the latter, to reduce overall cavity length.

The short cavity length makes the laser assembly insensitive to thermal expansion since the cavity modes are so far apart in frequency. In longer cavities, the frequency spacing is smaller and thermal expansion more significant in causing instabilities and mode "hopping". Longer cavities must be thermally stabilized. The short cavity also reduces the effects of small misalignments of the cavity mirrors. Because of this enhanced stability, the temperatures of the laser crystal and of the doubling crystal need not be controlled. Stable operation has been demonstrated when one or both of the crystals is heated to 50° C. above ambient temperature. Destabilization due to birefringence in the doubling or laser crystal does not occur. A stable output at the doubled frequency is observed even when a waveplate is introduced into the cavity to introduce depolarization. These results present a striking contrast to the instabilities and delicate alignment requirements of prior constructions.

Figure 3:
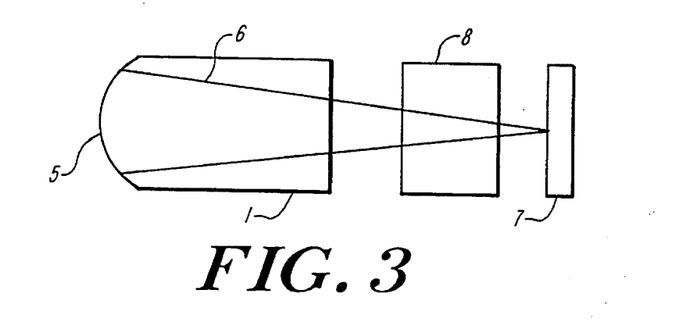
FIG. 3 shows details of the cavity mode and curved back mirror of the embodiment of FIG. 1.

Returning now to a discussion of FIG. 2, the back mirror 5 is preferably curved, as FIG. 3 shows, to form a waist 6' in the fundamental beam 6 as it passes through the doubling crystal 8. This focusing of the beam 6 by the curved mirror 5 increases peak fundamental intensity in the doubling crystal. However, in other constructions, the back mirror 5 may be flat, and thermal lensing arising in the laser crystal 1 may be relied upon to focus the intracavity fundamental radiation to form a waist in the doubling crystal. In the preferred embodiment, the back mirror 5 is deposited as a coating directly onto the laser crystal 1, thereby reducing intracavity losses, and the back face of the crystal is curved to provide the desired focal properties of the mirror 5.

Figure 4:
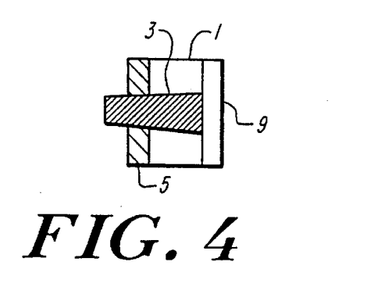
FIG. 4 shows a laser crystal with reflective coating to backreflect diode light not absorbed on the first pass.

FIG. 4 shows a further preferred feature to reduce losses. The laser crystal 1 is reduced in axial length and has a reflector 9 coated on its front face to back-reflect any unabsorbed pump light 3. This reflector 9 is highly absorbing at the diode pump wavelength, and highly transmitting at the fundamental wavelength.

In an alternate embodiment which otherwise has the same layout as shown in FIG. 1, the diode pump radiation is focused into the end of the laser crystal from a high brightness laser diode using a construction similar to that reported in the article by Zhou, et al. in Opt. Lett., Vol. 10 (Feb. 1985) pp. 62, the disclosure of which is incorporated herein by this reference.

Figure 5:
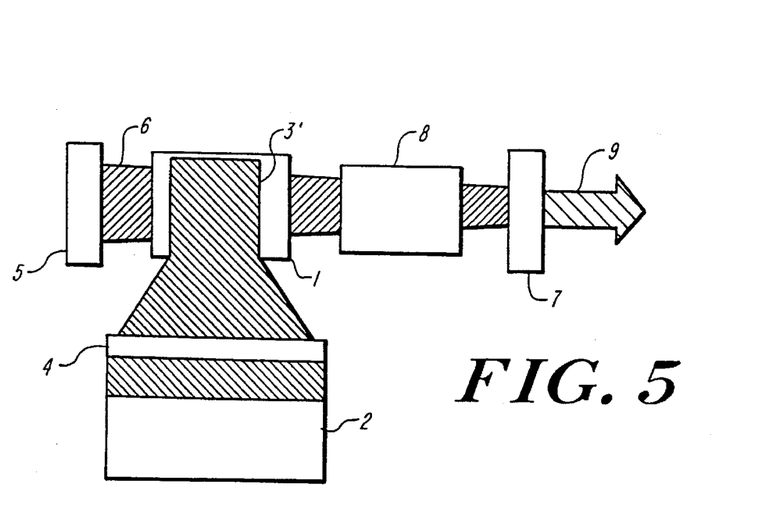
FIG. 5 shows an alternative embodiment in which the laser is side-pumped rather than end-pumped.

FIG. 5 shows yet another embodiment, wherein the laser crystal 1 is "side-pumped" and the diode radiation, which may be provided by a linear diode array (see, for example, Keyes & Quist, Appl. Phys. Lett. Vol. 4 (1974) pp. 50, or U.S. Pat. No. 3,982,201 of Rosenkrantz, the disclosures of which are incorporated herein by this reference), is focused along the length of the laser crystal to limit the spatial extent 3' of the gain region along the axial direction of the laser cavity. Here, the linear diode array 2 is imaged by an imaging element 4 that focuses in at least the axial direction (of the crystal) so as to pump a short length of the laser crystal 1. The other components are substantially like those described in FIG. 1.

Figure 6A:
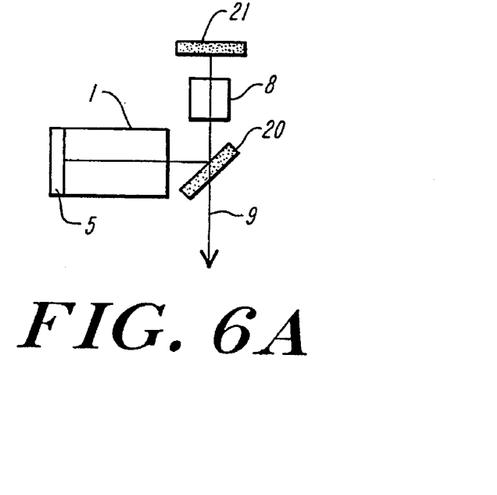
FIG. 6(a) shows a 45° fold.
Figure 6B:
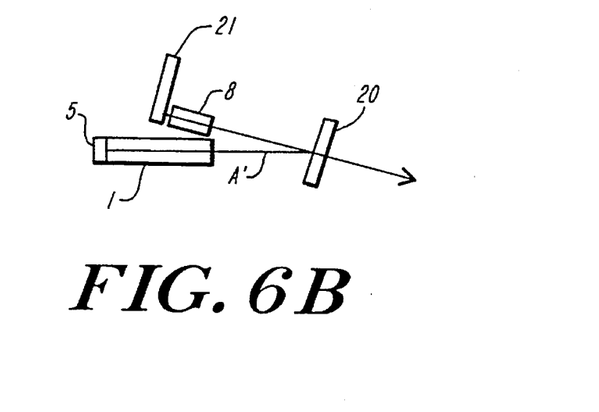
FIG. 6(b) shows a small angle fold which minimizes discrimination between the s- and p-polarized intracavity fundamental laser light.

In another embodiment, shown in FIG. 6a, the optical cavity is folded—by introducing a bend in the optical axis A and illustrated with a magnitude of 90 degrees—by a dichroic mirror 20 that reflects the flux of the fundamental laser beam 6, and transmits the flux of the frequency doubled beam 9. The front mirror described above is replaced with a fully reflecting mirror 21 that reflects both the fundamental and the second harmonic radiation. In this embodiment, the frequency-doubled light, from both the forward and the reverse passes of the fundamental through the doubler 8, is collected in a single unidirectional output beam 9. The fold angle need not be 90° and may, for example be less than 90°, with the mirror 20 tilted at an angle between 1° and 45° relative to the optical axis A' output from the crystal 1. The smaller angle may be used to prevent polarization discrimination, which leads to instabilities when the laser crystal exhibits thermally-induced birefringence. If the laser crystal is an anisotropic medium such as Nd:YAG, then the folding mirror causes a slight discrimination between the gains of s- and p- polarizations of laser emission, as discussed in the L. R. Marshall, et al. article in IEEE J. Quantum Electron., Vol. 28 (1992) pp. 1158. The s-polarization experiences the highest mirror reflectivity, and therefore the lowest loss in the laser cavity. Lasers tend to lase in their lowest loss state, so the polarization of the fundamental will orient itself to minimize the loss; i.e., the laser will lase in s-polarization. Since s- and p- polarization reflectances vary slightly with angle of incidence, the effects of small birefringence may be countered by arranging the folding mirror at a smaller angle of incidence. Folding at a small angle is depicted in FIG. 6b. It will be understood that such orientation changes the interference path lengths in the mirror coating. Accordingly, the folding mirror 20 is coated for high reflection of the fundamental and for high transmission of the second harmonic, at the small angle of incidence employed.

Figure 7A:
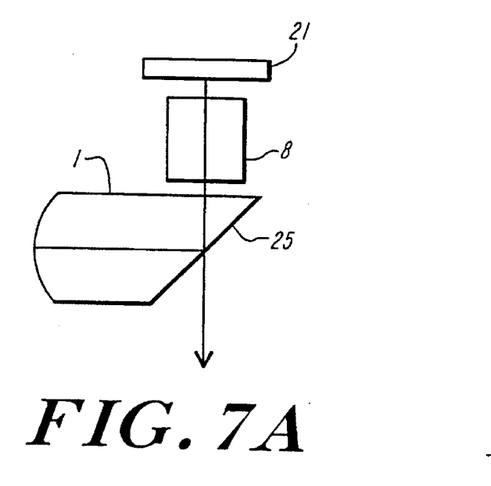
FIG. 7(a) shows a separate mirror.

In yet another alternative embodiment, shown in FIG. 7a, the cavity is folded without using extra mirrors by cutting the front face of the laser crystal 1 at an appropriate angle relative to the optical axis and coating this angled end face 25 as a dichroic to reflect the fundamental and to transmit the second harmonic. This construction lowers overall loss by reducing the number of intracavity elements and interfaces, and reducing the path length of doubled light through the laser crystal, thereby enhancing doubling efficiency.

Figure 7B:
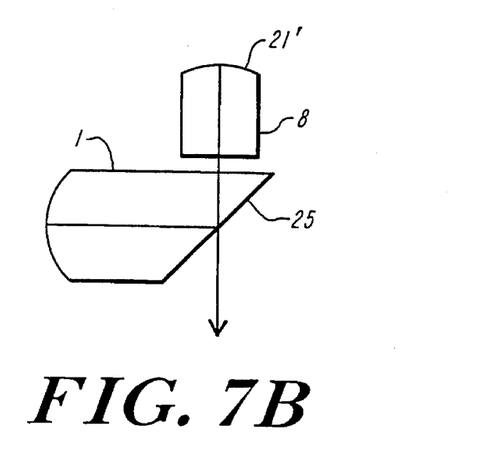
FIG. 7(b) shows a curved mirror deposited directly onto the doubling crystal.

A modification to the embodiment of FIG. 7a is shown in FIG. 7b, in which the "front" total reflector 21 is formed as a reflective coating 21' coated directly onto the doubling crystal 8. The crystal surface can be curved, for focusing light energy it reflects, to render the crystal relatively insensitive to slight misalignments and allow fine adjustment of the doubler alignment without misaligning the cavity.

Figure 8:
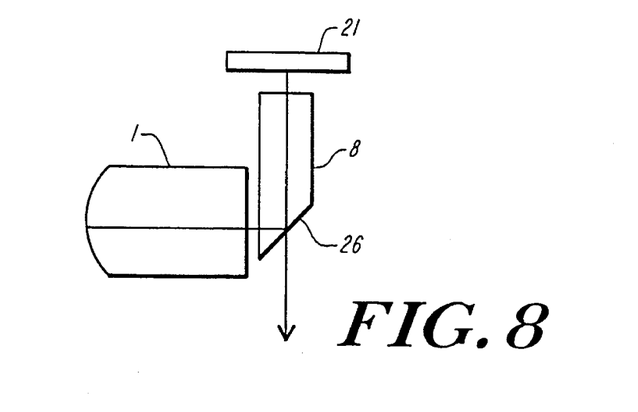
FIG. 8 shows another alternative folded cavity embodiment wherein the fold is achieved by an angled reflecting face on the doubling crystal.

Folding without a separate intracavity mirror is achieved in yet another alternative embodiment shown in FIG. 8, in which one face 26 of the doubler 8 is cut at an appropriate angle (typically 45°) and coated with a dichroic to reflect the fundamental and to transmit the second harmonic. This lowers the loss and enhances doubling efficiency. By incorporating a folding reflector in a face of the doubler to output couple the doubled light 9, performance is improved over the previous method in which the Nd:YAG was cut to provide the folding mirror, since the construction of FIG. 8 entirely avoids absorption of the second harmonic in the laser crystal 1. In this approach, the second harmonic exits the cavity in the beam 9, before reaching the laser crystal.

Figure 9:
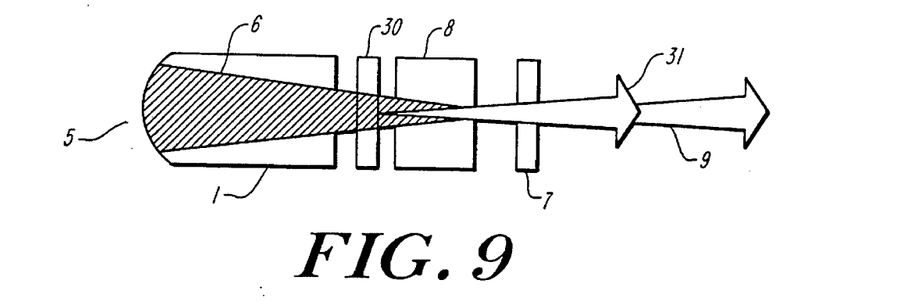
FIG. 9 shows an alternate linear cavity embodiment with an additional mirror to reflect the backward-propagated second harmonic light through the front mirror in the same direction as the forward-generated second harmonic.

Another embodiment for linear cavity operation is shown in FIG. 9, wherein an intracavity mirror 30, which is highly reflecting at the doubled wavelength but transmitting at the fundamental wavelength, is placed between the laser crystal 1 and the doubler 8. This mirror 30 reflects the backward pass of doubled light back through the doubler so that both the forward doubled beam 9 and the backward doubled beam 31 exit the cavity as a single beam in the same direction. This eliminates absorption of doubled light in the crystal 1, without folding the cavity as in the previous alternate embodiments.

In a preferred implementation of this embodiment, the mirror 30 is rigidly aligned with respect to the back mirror 5 to form an intracavity etalon which further limits the number of longitudinal cavity modes. This embodiment recognizes the present technical difficulty in obtaining a dichroic coating that is both reflecting at the second harmonic and has low loss of the fundamental. Current coatings obtain only about 95% transmission at the fundamental if they are also required to be highly reflecting to the second harmonic.

Figure 10:
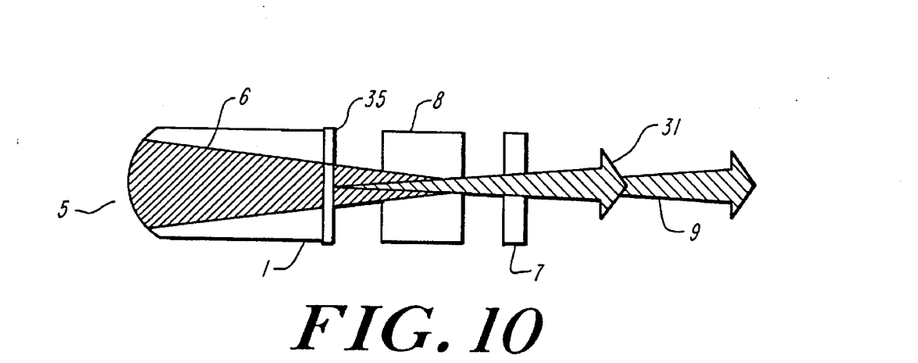
FIG. 10 shows an embodiment similar to that of FIG. 9, with the mirror deposited directly onto the front face of the laser crystal as a low finesse etalon to narrow line width of the laser output.

In a further preferred embodiment, a mirror 35 is deposited as a coating directly onto the front of the laser crystal 1, as shown in FIG. 10, so that a monolithic etalon is formed by the laser crystal 1 itself. This monolithic approach makes the etalon, which is formed by the elements 1, 5 and 35, more stable.

Figure 11:
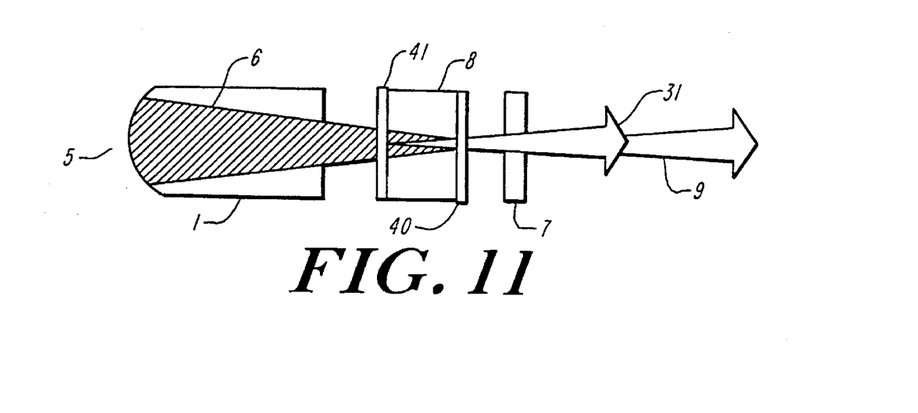
FIG. 11 shows an embodiment similar to that of FIG. 10, with coatings deposited on the doubling crystal to act as a low finesse etalon and narrow the line width of the laser output, while also reflecting the backward doubled light as in FIG. 9.

An alternative embodiment implementing a monolithic intracavity etalon is shown in FIG. 11. Here, the doubling crystal 8 is coated as a low finesse etalon with small reflectivities (typically 5–20%) at the fundamental. The face 41 of the doubler 8 closest to the laser crystal 1 is highly reflective at the second harmonic wavelength and, therefore, incurs the unavoidable (but small) reflectivity at the fundamental. The other face 40 has a highly transmitting coating at the second harmonic, and reflectivity at the same high level at the fundamental. The etalon effect limits the number of longitudinal modes in the laser and thereby stabilizes it. Intracavity loss is minimized since no additional elements or interfaces are introduced, and doubling efficiency is also increased, because the etalon "traps" additional pump radiation within the doubling crystal.

The invention can also be practiced with a front mirror that has a curvature, so as to exacerbate the walkoff between fundamental and second harmonic and, thereby reduce the doubling efficiency for the backward pass. This leaves a higher intracavity pump fluence available for doubling in the forward direction. With this construction, only a negligible amount of backward-propagating doubled light is generated, and no special components such as mirror 30 of FIG. 9 are necessary to avoid absorption in the crystal 1.

In another embodiment (not shown), the linear cavity system may be configured to reduce the backward doubling efficiency and, thereby, increase the forward doubled output, by employing a reflective coating on the front mirror 7 which is deposited so as to induce a half-wave phase shift in the fundamental light. This causes back conversion of the residual second harmonic into the fundamental, so that the doubled light not coupled into the output beam 9 augments the reflected fundamental to enhance the forward doubled output.

Figure 12:
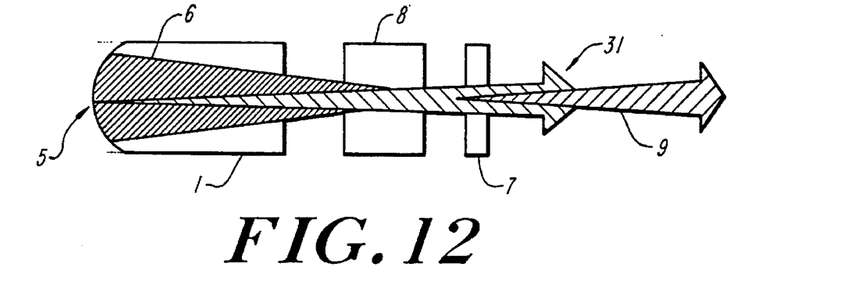
FIG. 12 shows another embodiment to obtain both passes of doubled light in one output beam, using a laser crystal with low absorption at the second harmonic wavelength, and a second harmonic reflector coated on the back face of the laser crystal.

In yet another embodiment shown in FIG. 12, crystal 1 is replaced by a laser material 1' which does not absorb strongly at the second harmonic wavelength, such as a Nd:YLF material, and is arranged to form a linear cavity from which both passes of the doubled radiation are extracted. In this embodiment, the back mirror 5 of the laser crystal 1' is coated to also reflect the reverse pass 31 of the doubled light, causing it to emerge through the front mirror 7 with the forward doubled light 9 in a single beam.

Figure 13:
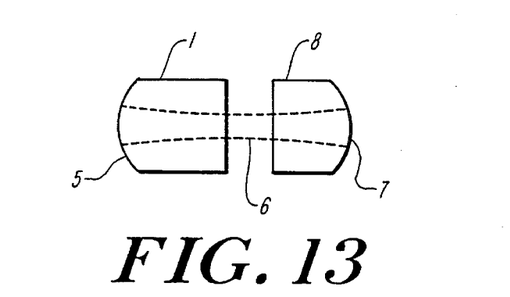
FIG. 13 shows another embodiment with coatings deposited directly onto surfaces of the doubling and laser crystals.

In another embodiment shown in FIG. 13, the laser and doubling crystals 1 and 8 form a linear cavity and the front and back mirrors 5 and 7 described in the preceding embodiments are deposited directly onto the outer ends of the laser and doubling crystals, respectively. The curvatures of the two mirrors are chosen to ensure stable operation even in the presence of slight misalignments of the two crystals, i.e., are curved to make the optics relatively insensitive to slight off-axis "rocking" of the crystals. This allows quick and easy alignment of the doubler for optimum doubling efficiency.

While preferred embodiments of the invention are illustrated and described, it is to be understood that these are capable of being varied and modified and the invention is not limited to the details set forth, but includes such modifications and variations as will occur to one skilled in the art, within the scope of the following claims and equivalents thereof.

What is claimed is:

1. A laser device comprising a laser crystal in which diode pump radiation is confined to less than approximately ten millimeters of axial length along the optical axis, optical pumping means for producing pump light, imaging means for collecting and directing the pumping light into the laser crystal in alignment with respect to a desired laser cavity mode to pump the laser crystal and produce fundamental laser light, a back mirror which reflects the fundamental laser light, a front mirror which is highly reflecting at the fundamental laser wavelength, the front mirror forming with the back mirror a resonant optical cavity around the laser crystal, a non-linear optical crystal placed in the cavity between the laser crystal and front mirror to convert the fundamental laser light to light of another wavelength forming a laser output light, wherein said resonant optical cavity has a length between ten millimeters and ten centimeters, which, in conjunction with the non-linear crystal, is effective in limiting instabilities and noise in the laser output light.

2. The laser device of claim 1, further comprising heat conduction means in thermal contact with the laser crystal for conductively removing heat from the laser crystal.

3. The laser device of claim 1, wherein the imaging means directs pump light into an end of the laser crystal.

4. The laser device of claim 1, wherein the imaging means focuses pump light into the side of the laser crystal limiting spatial extent of a gain region along the axial direction of the laser cavity.

5. The laser device of claim 1, wherein the optical cavity is folded with a dichroic mirror placed at an angle between 1° and 45°, which reflects the fundamental laser light and transmits light of the converted wavelength; and wherein the front mirror is a total reflector at the fundamental and converted wavelengths such that both forward and reverse propagating beams at the converted wavelength are coupled out of the cavity through the dichroic mirror.

6. The laser device of claim 5, wherein the total reflector is coated directly onto a face of the non-linear optical crystal.

7. The laser device of claim 1, wherein the cavity is folded without extra mirrors by a face of the laser crystal cut at an angle and coated as a dichroic to transmit the fundamental laser light and reflect light of the converted wavelength.

8. The laser device of claim 1, wherein the cavity is folded without extra mirrors by a face of the non-linear optical crystal cut at an angle and having a dichroic deposited thereon to transmit light of the converted wavelength and reflect the fundamental laser light.

9. The laser device of claim 1, wherein a mirror that partly transmits the fundamental laser light and totally reflects the converted wavelength is deposited directly onto a face of the laser crystal to form an etalon of the laser crystal itself so as to limit the number of longitudinal cavity modes and enhance stability of the laser output.

10. The laser device of claim 1, wherein the front mirror is curved to accentuate walkoff between fundamental laser light and wavelength converted output light thereby reducing wavelength conversion efficiency of backward reflected fundamental laser light.

11. The laser device of claim 1, wherein the front mirror has a reflective coating deposited so as to induce a phase shift in the fundamental laser light and cause back conversion of residual wavelength converted output light into the fundamental light, thereby increasing forward wavelength converted output.

12. The laser device of claim 1, wherein the non-linear optical crystal is coated to form an etalon with at least partial reflectivity at the fundamental wavelength, such that a first face of the non-linear optical crystal lies closest to the laser crystal and is highly reflective at the converted wavelength, while a second face is highly transmitting at the converted wavelength, and equally highly reflective at the fundamental.

13. The laser device of claim 1, wherein the laser crystal has opposed front and rear faces, and the front of the laser crystal is coated so as to form with the laser crystal an etalon to limit longitudinal mode structure of the laser output, said coating also being reflective of converted wavelength propagating backward in said crystal.

14. The laser device of claim 1, wherein the laser crystal is a material that absorbs weakly at the converted wavelength, and the back mirror is coated to reflect a reverse pass of light of the converted wavelength to emerge through the front mirror, so that backward converted light is reflected by the back mirror and combines with forward converted wavelength light in a single output beam.

15. The laser device of claim 1, wherein the pumping means includes a pump source which is imaged into a region of limited transverse extent within the laser crystal to control the number of transverse cavity modes, reducing mode beating.

16. The laser device of claim 15, including a mirrored coating located at a rear of the crystal that introduces a shift upon reflection for effectively canceling depolarization caused by thermal birefringence in the laser crystal.

17. The laser device of claim 1, wherein the pumping means includes a high brightness source directed to a pumped volume of limited transverse dimensions within the laser crystal to form a limited region of thermal lensing and birefringence.

18. The laser device of claim 1, wherein the pumping means includes a diode array coupled through optical fiber as a high brightness diode pump source for providing increased diode intensity for pumping the laser crystal.

19. The laser device of claim 1, wherein the back mirror is deposited directly onto the laser crystal and the front mirror is deposited directly onto the non-linear optical crystal.

20. The laser device of claim 1, where the non-linear optical crystal is heated.

21. A stabilized laser comprising cavity means, including at least a front minor and a back mirror for forming a laser cavity a laser crystal in said cavity means for pumping the laser crystal to produce fundamental frequency laser light a non-linear optical element in said cavity which causes loss of fundamental frequency laser light from the cavity, wherein the laser cavity has a characteristic spiking frequency, and said non-linear optical element causes a higher loss of fundamental frequency laser light when laser light is spiking than when the laser light is not spiking, thereby causing the laser crystal to produce a continuous-wave laser output.

22. A stabilized laser according to claim 21, wherein the front and back mirrors are spaced such that longitudinal modes of said laser cavity have a separation greater than about one gigahertz.

23. A stabilized laser according to claim 21, wherein the non-linear optical element includes a non-linear crystal which converts said fundamental frequency laser light into light of another wavelength, and the optical cavity means directs fundamental light along differently-aligned forward and backward paths such that conversion by said non-linear crystal occurs preferentially in the forward path.

24. A stabilized laser according to claim 21, wherein said means for pumping includes laser diode means for generating diode laser light, and means for delivering the diode laser light into a confined region within the laser crystal to excite laser modes of the crystal.

\* \* \* \* \*